3,336,401
AR-NITRO-α-(2,2,2-TRICHLOROETHYL)
STYRENE COMPOUNDS
Leo R. Morris, Midland, Mich., assignor to The Dow Chemical Company, Midland, Mich., a corporation of Delaware
No Drawing. Filed June 27, 1966, Ser. No. 560,908
11 Claims. (Cl. 260—646)

ABSTRACT OF THE DISCLOSURE

The present invention is concerned with the nitration of α-(2,2,2-trichloroethyl)styrene to obtain the corresponding ar-nitro-α-(2,2,2-trichloroethyl)styrene compounds, which compounds are of the following structural formula:

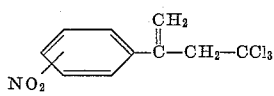

These compounds are useful as agents to alter the growth of plants.

---

The present invention is concerned with ar-nitro-α-(2,2,2-trichloroethyl)styrene compounds, to methods employing and compositions comprising the compounds for the control of plant growth, to intermediates useful in the synthesis of certain of the compounds, and to methods for the synthesis of certain of the compounds. These ar-nitro-α-(2,2,2-trichloroethyl)styrene compounds are of the following structural formula:

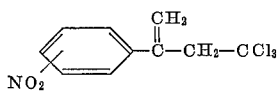

This formula designates three products, varying only as to the position of the nitro group on the benzene ring: the ortho-nitro product, the meta-nitro product, and the para-nitro product. The ortho and meta products are liquids at room temperatures, and the para product is a crystalline solid at room temperature. All of the products are useful as agents to control the growth of plants; they are particularly effective as agents to selectively control weeds growing in various crop plants.

On the basis of teachings in the prior art concerning nitration and its limitations, it was expected that the products of the present invention could not be synthesized by direct nitration of the corresponding compound having no benzene substituent, i.e., α-(2,2,2-trichloroethyl)styrene. However, it has now been discovered that the products of the present invention can be obtained in this manner. The substance obtained from nitration comprises a mixture of all three isomers; however, due to the directing influence of the (2,2,2-trichloroethyl) group, the ortho and para isomers together constitute the major portion of the isomeric product mixture, generally from 90 to 95 percent. The meta product is present in only small amounts, and because of this fact, as well as the fact that it can be separated from the other isomers only with difficulty, direct nitration is not a practical method for the synthesis of the meta product. However, for the ortho and para products, direct nitration of α-(2,2,2-trichloroethyl)styrene is the preferred method of synthesis. The identity of the nitrating agent, reaction times and temperatures, and other such factors, are not critical. Thus, as nitrating agent there can be employed nitric acid, fuming nitric acid, a mixture of nitric and sulfuric acids, other mixtures having as a major component nitric acid, nitronium tetrafluoroborate, dinitrogen pentoxide, and the like. For best yields, it is preferred that the nitration be conducted under mild nitrating conditions, e.g., shorter reaction times and lower temperatures within the known ranges for such factors. Two sets of reaction conditions which have been found convenient and especially suited to the preparation of the ortho and para products are set forth hereinbelow.

In the first of these sets of reaction conditions, the α-(2,2,2-trichloroethyl)styrene is reacted with, as nitrating agent, a mixture of sulfuric and nitric acids. The nitric acid may be supplied in any concentration; generally, though, it is convenient and preferred to employ either nitric acid of a concentration of about 70 percent, or so-called "fuming nitric acid," generally having a concentration in excess of 70 percent, such as 90 percent. Similarly, the sulfuric acid may be supplied to the reaction in any concentration; generally, though, a concentration of about 90 percent is convenient and preferred. The ratio of nitric acid and sulfuric acid is not critical; an approximately 1:1 ratio is convenient and gives good results. The reaction is exothermic and goes forward readily under temperatures of a wide range, such as at temperatures of from —20° to 60° C. However, the reaction is preferably conducted at temperatures of from 0° to 20° C., or, yet more preferably, at temperatures of from 0° to 10° C. At these preferred temperatures, higher yields of product are obtained. The reaction can be carried out in the presence of an inert liquid reaction medium; suitable such media include nitrobenzene, methylene chloride, and carbon tetrachloride. However, since the α-(2,2,2-trichloroethyl)styrene reactant is, itself, a liquid and thereby serves to facilitate the contacting of the reactants, there is generally no advantage to employing a separate liquid as a reaction medium.

The exact amounts of the α-(2,2,2-trichloroethyl)styrene compound and the mixture of nitric and sulfuric acids employed are not critical, some of the desired product being obtained when employing any amounts. As is known for nitration reactions, generally, the preferred amounts of nitrating agent and compound to be nitrated are dependent upon such factors as the concentration of the acids and their relative proportions. Where a mixture of 70 percent nitric and 98 percent sulfuric acid, in a ratio of one part of the former to one and one-fourth parts of the latter, is employed as nitrating agent, a two fold excess of nitric acid generally gives good yields. Where the nitric acid employed is more dilute, and/or where the nitric acid forms a smaller proportion of the total nitrating agent employed, a larger excess of nitric acid, such as up to a ten-fold excess, is preferred. As is also known, preferred amounts of nitrating agent and compound to be nitrated are further related to reaction temperatures and times, a larger excess of nitric acid being preferred where it is desired to use short reaction times and/or to conduct the reaction at lower temperatures.

Higher yields are generally favored by separating the product of nitration promptly upon the approximate completion of the reaction. As noted, appropriate reaction time is dependent upon other conditions under which the nitration is carried out. When employing 70 percent nitric acid and 98 percent sulfuric acid in a ratio of about 1:1, and in the temperature range of 0–10° C., higher yields are obtained when the reaction period does not exceed about one hour. In view of the foregoing and of the prior art teachings concerning nitration, those skilled in the art will be able to choose appropriate reaction times for the various other reaction conditions employed.

Separation of the isomeric product mixture from the reaction mixture, and subsequent separation of the ortho and para isomers from the mixture, are achieved in conventional procedures. Typically, in removing excess nitrating agent, the reaction mixture is mixed with water, the resulting mixture extracted with a suitable solvent, conveniently carbon tetrachloride, and, if desired, the extract washed with water. Solvent is removed from the extract to obtain the isomeric product mixture as a residue. This product residue is mixed with a loweralkanol and cooled to precipitate the para isomer, which can then be separated by filtration, and, if desired, purified by recrystallization, conveniently from a further portion of loweralkanol. The filtrate remaining from the separation of the para isomer and containing the ortho isomer, as well as trace amounts of the meta isomer and perhaps also trace amounts of the para isomer, is thereafter treated in conventional procedures. Typically, solvent is removed by evaporation under subatmospheric pressure to obtain a product consisting essentially of the ortho isomer. This ortho product, a liquid, can also be purified by conventional procedures. In view of the similarity of solubilities and other properties of the various isomers, it is difficult to achieve a complete separation, and, the meta isomer being present in only very small amounts, nitration is unsuitable as a synthesis method for the meta isomer. An alternate method is presented below. Moreover, since all of the isomers exhibit the desirable plant growth control properties of the present invention, complete separation serves no practical purpose.

In the second set of nitrating conditions, acetyl nitrate is employed as nitrating agent. The acetyl nitrate is conveniently prepared in situ from nitric acid and acetic anhydride; the amounts employed are not critical. Where 100 percent nitric acid is used, equimolecular amounts give good results. Where nitric acid of a lesser concentration is used, it is necessary for good yields to employ sufficient excess acetic anhydride to serve as a dehydrating agent for all water initially present in the acid. This procedure for nitration, which like the foregoing nitration procedure is exothermic, goes forward at temperatures of from 0 to 100° C. and preferably at temperatures of from 20 to 40° C. The reaction consumes the α-(2,2,2-trichloroethyl)styrene and acetyl nitrate in amounts representing equimolecular proportions; the use of such amounts is generally preferred, although an excess of the acetyl nitrate can be employed. The reaction can be carried out in the presence of a separate liquid reaction medium; however, the preparation in situ of the nitrating agent results in the preparation of acetic acid, which serves as a medium to facilitate the contacting of the reactants; and, as previously noted, the α-(2,2,2-trichloroethyl)styrene starting material is itself a liquid. As in the foregoing nitration procedures, it is preferred to separate the product of the nitration upon the completion of the reaction. The composition of the reaction mixture is essentially the same as that obtained from nitration in accordance with the foregoing reaction conditions, and separation and, if desired, purification, are carried out in essentially the same manner.

Since the meta product of the present invention is not conveniently prepared by direct nitration, the meta isomer is preferably prepared in another synthetic method which is also appropriate for the preparation of the para-product of the present invention. In this synthetic method, carbon tetrachloride is reacted with m-nitro- or p-nitro-α-methylstyrene to obtain the corresponding ar-nitro-α-(2,2,2-trichloroethyl)styrene product of the present invention. The reaction is initiated by employing a free-radical initiator, which can be an organic peroxide, such as acetyl peroxide, benzoyl peroxide, and the like; or, preferably, the combination of an organic amine and a copper-containing material. Ultraviolet light or gamma radiation can also be employed as a free-radical initiator; but the use of either of these is seldom preferred.

The reaction is exothermic and at least initiates satisfactorily at temperatures over a wide range, such as, for example, —50° to 200° C. Preferably, the reaction is conducted at temperatures of from about 25° to 100° C. The pressure under which the reaction is carried out is not critical; conveniently, atmospheric pressures are employed. The reaction can be carried out in the presence or absence of an inert liquid reaction medium. Suitable organic liquids which can be employed as inert liquid reaction medium include hydrocarbons, such as pentane, benzene, and cyclohexane; and ethers, such as diethyl ether. It is preferred to avoid the use of a halogenated or olefinic organic compound as reaction medium, unless excess carbon tetrachloride or m-nitro-α-methylstyrene be employed in this capacity (p-nitro-α-methylstyrene being a solid material).

The amounts of the reactants to be employed are not critical, some of the desired product being formed when employing any amounts. However, when it is desired to obtain higher yields within shorter reaction time and to employ the reactants in the amounts most efficient for complete conversion, it is preferred to employ one molecular proportion of the m- or p-nitro-α-methylstyrene reactant and from one to four molecular proportions of carbon tetrachloride. The free-radical initiator is employed in such amount as to effectively initiate the reaction. Generally, when the organic amine/copper-containing material combination is employed as free-radical initiator, good results are obtained when employing from 0.01 atomic equivalent of copper, and from 0.1 molecular equivalent of amine, both per molecular equivalent of that reactant which is present in limiting quantity. Larger amounts can be employed but seldom offer any advantage and are economically undesirable. The identity of the amine is not critical; however, various amines are more effective than others and their use is preferred. Such more effective amines include piperidine, diethylamine, diisopropylamine, and dicyclohexylamine. The copper can be obtained from any of a great many copper-containing substances, including metallic copper and inorganic and organic copper salts; however, the preferred copper-containing materials are cupric chloride and cuprous chloride. When an organic peroxide is employed as free radical initiator, an amount of about 0.02 to 0.2 molecular proportion per molecular proportion of that reactant which is present in limiting amount is generally effective.

In carrying out the reaction the m- or p-nitro-α-methylstyrene compound is contacted with the carbon tetrachloride under the influence of the free-radical initiator, and, when desired, in the presence of an inert liquid reaction medium. Some of the desired product is prepared immediately upon the contacting together of the reactants in the presence of the free-radical initiator; however, higher yields generally result if the reaction mixture is permitted to stand for a period of time in the reaction temperature range following the completion of the contacting together of the reactants. The reaction results in the preparation of 2-(nitrophenyl)-1,1,1,3-tetrachlorobutane, the position of the nitro group on the benzene ring corresponding to its position in the starting material. The product is thereafter separated from the reaction medium, if employed, and from excess reactant or reactants and free-radical initiator, by conventional procedures, such as, for example, fractional distillation under subatmospheric pressure, washing, filtration, and the like. Each of the 3-(m-nitrophenyl)-1,1,1,3-tetrachlorobutane and 3-(p-nitrophenyl) - 1,1,1,3-tetrachlorobutane products is a liquid and is useful as an intermediate which upon dehydrohalogenation yields the corresponding m- or p-nitro-α-(2,2,2 - trichloroethyl)styrene product of the present invention. In addition, each of these products can itself be employed as an agent to control the growth of plants.

The dehydrohalogenation by means of which the separated 3-(m- or p-nitrophenyl)-1,1,1,3-tetrachlorobutane product is converted to the corresponding ultimate product of the present invention is carried out at temperatures of from 125° to 200° C. While the dehydro halogenation can be carried out in a solvent, each compound concerned is itself a liquid; accordingly, it is preferred to employ no solvent. The dehydrogenation reaction can be effected merely by heating to the appropriate temperatures, but the reaction is catalyzed by the presence of a small amount of iron, and the employment of the same is preferred. While other sources of iron can be employed, the most convenient source, and the source found to give the best results, is steel wool. Generally, an amount of steel wool which represents about 1 to 5 percent, by weight, of the 3-(nitrophenyl)-1,1,1,3-tetrachlorobutane starting material is adequate to effect the desired catalysts. Higher amounts can be employed but seldom offer any advantage and are economically undesirable. In carrying out the reaction, the iron and 3-(m- or p-nitrophenyl)-1,1,1,3-tetrachlorobutane compound are contacted together in the reaction temperature range and held thereat for a period of time, provision being made for the removal of the hydrogen chloride produced. Typically, in the instance of the meta starting material, the starting material is simply distilled under subatmospheric pressure to obtain the meta product. In the instance of the para starting material, the reaction is typically carried out by heating the starting material to the reaction temperature range under subatmospheric pressure to obtain the dehydrohalogenated product; upon cooling to room temperature, the product crystallizes, or can be made to crystallize by slurrying with a suitable solvent and filtering the resulting slurry. In either instance, the desired meta or para product of the present invention is thus obtained and separated; if desired, either product can be purified in conventional procedures.

Regardless of the synthesis method employed in the preparation of the ar-nitro-α-(2,2,2-trichloroethyl)styrene products, the product or products, as above discussed, can be separated from the reaction mixture and/or from one another before being employed for the useful purposes of the present invention, and, if desired, can in addition be purified. However, it is not necessary that the product or products be separated from the reaction mixture, it being in many instances acceptable to employ the unmodified reaction mixture which may comprise more than one of the products, in addition to minor amounts of starting material(s), reaction medium, and/or byproducts. Moreover, as previously noted, separation of the various isomers, where a mixture is obtained, is unnecessary.

The m-nitro-α-(2,2,2 - trichloroethyl)styrene product represents a particularly preferred embodiment of the present invention, inasmuch as one application of the same affords plant growth control over a prolonged period of time.

The following examples illustrate the preparation of the products of the present invention and will enable those skilled in the art to practice the same.

*Example 1.—p-Nitro-α-(2,2,2-trichloroethyl)styrene*

α-(2,2,2-trichloroethyl)styrene (30.0 grams; 0.127 mole) was cooled with stirring to a temperature of 5–6° C. During the cooling, a mixture of 70 percent nitric acid (30 grams; 0.33 mole of acid) and 98 percent sulfuric acid (37.5 grams) was added portionwise over a period of one-half hour. The resulting reaction mixture was stirred for a period of one-half hour, the temperature being maintained below 8° C. A sample of the reaction mixture was then taken and subjected to analysis by vapor phase chromatography, the analysis indicating 98 percent conversion of the starting α-(2,2,2-trichloroethyl)styrene compound. The reaction mixture was mixed with a quantity of ice water and the resulting aqueous mixture extracted with several portions of carbon tetrachloride. The extracts were combined, washed with water, dried over sodium sulfate, and the resulting mixture concentrated on a steam bath under nitrogen to obtain a residue comprising the desired p-nitro-α-(2,2,2-trichloroethyl)styrene compound as well as o-nitro-α-(2,2,2-trichloroethyl)styrene. This product residue was diluted with an equal volume of ethanol and the resulting diluted mixture cooled to a temperature of about 10° C. During the cooling, the p-nitro-α-(2,2,2-trichloroethyl)styrene product precipitated in the reaction mixture and was separated by filtration. The separated product was purified by recrystallization from ethanol and the product thus obtained found to melt at 83–83.8° C.

*Example 2.—o-Nitro-α-(2,2,2-trichloroethyl)styrene*

The operations reported in Example 1 were duplicated, employing 45 grams of α-(2,2,2-trichloroethyl)styrene (0.19 mole), except that the product residue comprising the ortho and para isomers was subjected to fractional distillation. Four cuts resulted from the fractionation. The two lowest-boiling fractions, as well as the highest boiling fractions, were discarded. The remaining fraction, boiling at 140–160°/1.0 millimeter, was redistilled, the desired o-nitro-α-(2,2,2-trichloroethyl)styrene product boiling at 100–103°/0.2 millimeter. The product thus obtained had a refractive index $n_D^{25}$ of 1.5743.

*Example 3.—o(and p)-Nitro-α-(2,2,2-trichloroethyl)styrene*

Acetic anhydride (250 milliliters) was cooled to a temperature of 10° C. Thereafter, 90 percent nitric acid (26.5 grams; 0.38 mole) was added to the cooled acetic anhydride; the addition was carried out portionwise so that the temperature of the reaction mixture did not rise about 18° C. The reaction mixture was then further cooled to a temperature of —30° C. and α-(2,2,2-trichloroethyl)styrene (35 grams; 0.149 mole) added in one portion. After the addition, the reaction mixture was held at 0° C. for 15 minutes, then at 10° C. for another 15 minutes, and finally at 20° C. for about four and one-half hours. The reaction mixture was thereafter poured onto ice and the resulting mixture stirred for 3 hours and then permitted to separate into organic and aqueous phases. The aqueous phase was extracted with chloroform and combined with the separated organic phase and the resulting combination washed with water, dried, and then concentrated on a steam bath. As a result of these operations, there was obtained a product residue which analyzed as comprising 50 percent p-nitro-α-(2,2,2-trichloroethyl)styrene, 40 percent o-nitro-α-(2,2,2-trichloroethyl)styrene, 5 percent of m-nitro-α-(2,2,2-trichloroethyl)styrene, and 5 percent other materials.

*Example 4.—3-(m-nitrophenyl)-1,1,1,3-tetrachlorobutane* m-Nitro-α-methylstyrene of high purity (8.2 grams; 0.034 mole) was combined with 2.7 grams of an impure grade of the same substance, containing as an impurity mainly m-nitrocumene. Thereafter, there was added carbon tetrachloride (15 grams; about 0.1 mole); 0.06 gram of cupric chloride; and 0.6 millimeter of piperidine. The resulting mixture was heated to reflux temperature and maintained at that temperature for a period of about 23 minutes. Thereafter, the reaction mixture was permitted to cool to room temperature, washed with water, and concentrated by subjection to evaporation under subatmospheric pressure and heat of about 60° C. to separate the 3-(m-nitrophenyl)-1,1,1,3-tetrachlorobutane product as a residue. The product has a molecular weight of 317.

*Example 5.—m-Nitro-α-(2,2,2-trichloroethyl)styrene*

The 3-(m-nitrophenyl)-1,1,1,3-tetrachlorobutane product obtained as described in Example 4 was distilled, the desired m-nitro-α-(2,2,2-trichloroethyl)styrene product boiling at 155–165°/1 millimeter. Gas evolution occurred at 100–150° C. The product thus obtained was found to have a refractive index $n_D^{25}$ of 1.5784. The substance was analyzed by nuclear magnetic resonance which showed that the substance comprised 76 percent of the desired product, 9 percent of 3-(m-nitrophenyl)-1,1,1,3-tetrachlorobutane, 4 percent of m-nitro-α-methylstyrene, and 5 percent of undetermined materials.

*Example 6.—3-(p-nitrophenyl)-1,1,1,3-tetrachlorobutane*

To a solution of p-nitro-α-methylstyrene (10 grams; 0.06 mole) in 30 milliliters of carbon tetrachloride (0.22 mole), there was added 0.06 gram of cupric chloride and 1.5 milliliter of piperidine. The resulting reaction mixture was warmed to 80–85° C. and held at that temperature for a period of about 35 minutes. At that time, a sample was withdrawn and analyzed by vapor phase chromatography, which indicated that 95 percent of the p-nitro-α-methylstyrene had been converted. Accordingly, the reaction mixture was diluted with water and subsequently extracted with benzene. The benzene extract was concentrated by vacuum distillation to obtain the expected 3-(p-nitrophenyl)-1,1,1,3-tetrachlorobutane product. The product is a viscous liquid having a refractive index $n_D^{25.7}$ of 1.5817.

*Example 7.—3-(m-nitrophenyl)-1,1,1,3-tetrachlorobutane*

A solution of m-nitro-α-methylstyrene of >95 percent purity (500 grams; about 2.9 mole) in 1500 milliliters of carbon tetrachloride was mixed with 2.5 grams of anhydrous cuprous chloride and the resulting reaction mixture heated to a temperature of 60° C. Piperidine (25 milliliters) was introduced into the reaction mixture and an exothermic reaction was noted, the reaction mixture undergoing vigorous reflux for a period of about 10 minutes. Thereafter, the reaction mixture was heated to maintain reflux for an additional 30 minutes. The reaction mixture was then permitted to cool to room temperature and the cooled mixture washed twice with a dilute solution of hydrochloric acid and once with water to extract the salts. The washed mixture was concentrated at 90° C./12 millimeters, yielding the desired 3-(m-nitrophenyl)-1,1,1,3-tetrachlorobutane product.

*Example 8.—m-Nitro-α-(2,2,2-trichloroethyl)styrene*

A 300 gram portion of the 3-(m-nitrophenyl)-1,1,1,3-tetrachlorobutane product obtained as a result of the operations reported in Example 7 was mixed with 9 grams of steel wool and the resulting mixture heated to a temperature of 140–150° C. under 12 millimeters of pressure; the heating was continued for a period of about 2 hours.

Another 615 gram portion of the 3-(m-nitrophenyl)-1,1,1,3-tetrachlorobutane product obtained as a result of the operation reported in Example 7 was similarly treated. The crude materials obtained were combined, the combined mixture extracted with a solution comprising 500 milliliters of perchloroethylene and one liter of a petroleum hydrocarbon fraction boiling at 60–70° C., and the extract filtered. The filtrate was then concentrated under subatmospheric pressure to obtain the expected m-nitro-α-(2,2,2-trichloroethyl)-styrene product as a viscous liquid having a refractive index $n_D^{25}$ of 1.5908.

A portion of the product thus obtained was distilled, yielding two cuts. The higher boiling cut, 155–160° C./0.8 millimeter, had a refractive index $n_D^{25}$ of 1.5840. Elemental analysis was carried out and the results obtained were as follows—
Found: Carbon, 42.5; Hydrogen, 3.0; Chlorine, 37.6.
Calculated: C, 42.8; H, 2.9; Cl, 38.0.

Analysis by vapor phase chromatography indicated that the substance was of 99 percent purity.

As previously noted, the ar-nitro-α-(2,2,2-trichloroethyl)styrene products of the present invention, hereinafter designated as "nitrostyrene compound," are useful as agents to control the growth of plants. Accordingly, the present invention is also directed to methods employing and compositions comprising nitrostyrene compound for the control of the growth of plants.

Hence, the present invention is directed in one part to a method which comprises applying to a plant part a growth-altering amount of nitrostyrene compound of the formula

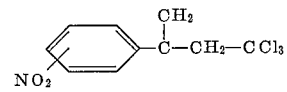

As employed in the present specification and claims, the terms "growth-altering" and "growth-altering amount" are concerned with a decisive adverse effect upon plants. The effect may be one of killing the plant to which the nitrostyrene compound is applied; suppression of the treated plant so that its further growth presents no deterrent to the growth of other desirable plants; or inhibition of the growth of the treated plant which in combination with naturally occurring conditions results in the eventual suppression or killing of the treated plant.

In particular, products to be employed in accordance with the present method have been found to have a high toxicity to the germinant seeds and seedlings of many small-seeded grasses. Thus, they can be employed for the selective control of small-seeded grasses in growth media planted with or supporting the growth of many species of broadleaf crop plants such as beets, radishes, cucumbers, clover, beans, flax, cotton, soybeans, peanuts, fruit bushes, vines and trees, and nursery stock. Also, nitrostyrene compound can be employed for the selective control of undesirable grasses in corn and in small grain crops, such as wheat, barley, and oats. The nitrostyrene compound can also be employed to selectively control undesirable grasses in rice paddies.

The application of nitrostyrene compound to a plant part can be effected by initial application to plants, plant parts (such as seeds or other reproductive units, such as root structures), and/or their habitats. Such application gives rise to varying degrees of response depending upon the nature of the plant or plant part, the stage of growth or maturity of the plant, and the dosage at which the exposure is carried out as well as the weather conditions of temperature and moisture and perhaps other factors incompletely known. When large dosages are applied to the foliage of plants a substantially complete kill is obtained. The distribution of large dosages in growth medium controls the growth of germinant seeds, of all types, including broadleaf plants as well as grasses. This approaches a sterilizing action. The weathering action of sun and rain, and possibly the decomposition of nitrostyrene compound by the action of bacteria and other soil organisms eventually frees the growth media of the compound. Soil or foliar applications of more dilute dosages of nitrostyrene compound suppress the growth of the germinant seeds and seedlings of many small-seeded grasses while having little or no effect upon the seeds, emerging seedlings or established plants of many broadleaf crop plants and even cereal grains and other crop grasses. Thus nitrostyrene compound can be employed for the selective control of the growth of the seeds and seedlings of small seeded grasses in a wide variety of crop plants.

The application to a plant part of a growth-altering amount of nitrostyrene compound is essential and critical for the practice of the present invention. The exact dosage to be supplied is dependent upon the plant species and the stage of growth thereof as well as the plant part to be exposed to the nitrostyrene compound. In non-selective foliage treatments, good results are obtained when from 1.0 to 200 pounds or more of nitrostyrene compound are applied per acre. In non-selective applications to growth media, good results are obtained when a dosage of nitrostyrene compound is supplied in the amount of from about 0.5 to 250 parts or more by weight per million parts by weight of the medium. In non-selective applications to soil, good results are obtained when nitrostyrene compound is distributed at a rate of from about 0.5 to 200 pounds or more per acre and through such a cross section of the soil as to provide for the presence therein of an effective concentration of nitrostyrene compound. In such application, it is desirable that the compound be distributed to a depth of at least 0.5 inch and at a substantially uniform dosage of at least 0.2 pound per acre inch of soil. In selective applications to foliage for the control of many undesirable weeds, and especially the seedlings of small-seeded grasses in many desired broadleaf plants, a substantially uniform dosage of from about 0.5 to 75 pounds of nitrostyrene compound per acre can be employed. In selective applications to growth media for the control of the germinant seeds and seedlings of many undesirable weeds, and especially those of small-seeded grasses in areas planted with the seeds of desired broadleaf plants or supporting the growth of such plants, a dosage of from 0.5 to 25 parts by weight of nitrostyrene compound per million parts by weight of soil has been found satisfactory. Depending on species response, heavier applications often give good selective weed control. In all selective applications, the exact dosage to be employed is dependent upon the resistance of the broadleaf crop plants or their seeds to the particular nitrostyrene compound employed, and related factors.

The method of the present invention can be carried out by applying an unmodified compound to a plant part. However, the present method also embraces the employment of a liquid or dust composition containing nitrostyrene compound. In such usage the compound can be modified with one or a plurality of herbicide carriers such as water, petroleum distillates or other liquid carriers; and cooperating substances such as surface active dispersing agents and finely divided solids. Depending upon the concentration of nitrostyrene compound, such augmented compositions are adapted to be distributed in the soil, or employed as concentrates and subsequently diluted with additional herbicide carrier to produce the ultimate treating compositions.

Such composition comprising nitrostyrene compound and herbicide carrier, with or without other cooperating substance, facilitates the practice of the present invention, and there is obtained a result which is much improved over the result obtained when unmodified nitrostyrene compound is employed in the practice of the present invention. More particularly, the utilization of herbicide carrier permits the growth-altering amount of nitrostyrene compound to be mixed in such quantity of ultimate treating material that adequate coverage of all plant parts or adequate admixture in growth medium can be obtained and thereby the desired growth-altering benefits of the present invention completely achieved. Some of these improved results of the utilization of herbicide carrier are obtained when employing the carrier in relatively small, but effective amounts. Generally, however, the improvement is best obtained by employing either a surface-active dispersing agent, in an amount sufficient to emulsify nitrostyrene compound with water, for example, an amount which represents from 0.1 to 15 percent, by weight, of the total treating material; or a finely divided carrier solid, in an amount which represents from 40 to 99.5 percent, by weight, of the total treating material.

The exact concentration of nitrostyrene compound to be employed in compositions for application to plants or growth media is not critical and can vary considerably provided the required dosage of effective agent is supplied on the plant part treated. The concentration of nitrostyrene compound in liquid compositions employed to supply the desired dosage generally is from about 0.0001 to 50 percent by weight, although concentrations as high as 90 percent by weight are sometimes conveniently employed. In finely divided solid carrier compositions, the concentration of nitrostyrene compound can be from 0.1 to 20 percent by weight. In compositions to be employed as concentrates, the nitrostyrene compound can be present in a concentration of from 5 to 98 percent by weight.

The quantity of treating composition to be applied can vary considerably provided that the required dosage of active ingredient is applied in sufficient of the finished composition to cover adequately the vegetation to be treated or to facilitate the penetration and distribution of the active agent in growth media. The required amount of the active agent conveniently can be supplied per acre treated in from 10 to 27,000 gallons or more of the liquid carrier or in from 10 to 2,000 pounds of the finely divided solid carrier. In the treatment of seedling weeds, good coverage is obtained when using from 10 to 60 gallons of finished spray composition per acre. Where leafy vegetation is concerned, it is frequently desirable to employ up to 250 gallons or more of the finished spray composition per acre to assure complete coverage of the above ground portion of the vegetation. In the application of dusts to plant foliage, good results are obtained with from 40 to 2,000 pounds of finished dust per acre, the only requirement being that the required nitrostyrene compound dosage be supplied in sufficient dust to achieve good coverage of the foliage.

Liquid compositions containing the desired amount of active ingredient can be prepared by dissolving nitrostyrene compound in an organic liquid carrier or by dispersing the nitrostyrene compound in water with or without the aid of a suitable surface active dispersing agent such as an ionic or non-ionic emulsifying agent. Suitable organic liquid carriers include the agricultural spray oils and the petroleum distillates such as diesel fuel, kerosene, fuel oil, naphthas and Stoddard solvent. Among the organic liquid carriers, the petroleum distillates are generally preferred. The aqueous compositions can contain one or more water immiscible solvents for the nitrostyrene compound. In such compositions, the carrier comprises an aqueous emulsion, i.e. a mixture of water, emulsifying agent and water immiscible solvent. The choice of dispersing and emulsifying agent and the amount thereof employed is dictated by the nature of the composition and by the ability of the agent to facilitate the dispersion of nitrostyrene compound in the carrier to produce the desired composition. Dispersing and emulsifying agents which can be employed in the compositions include the condensation products of alkylene oxides with phenols and organic acids, alkyl aryl sulfonates, polyoxyalkylene derivatives of sorbitan esters, complex ether alcohols, mahogany soaps, and the like.

In the preparation of dust compositions, the active ingredient is dispersed in and on a finely divided solid carrier such as clay, talc, chalk, gypsum, bentonite, Fuller's earth, attapulgite, and the like. In such operation, the finely divided carrier is mechanically mixed or ground with nitrostyrene compound. Depending upon the proportion of ingredients, these dust compositions can be employed as concentrates and subsequently diluted with additional solid carrier or with liquid or solid surface active dispersing agent to obtain the desired amount of active ingredient in a composition adapted to be employed for the suppression of the growth of the plants. Also, such dust compositions can be dispersed in water, preferably with the aid of a surface-active dispersing agent, to form spray mixtures.

Satisfactory results are obtained when nitro-styrene compound or a composition comprising nitro-styrene compound, is combined with other agricultural materials intended to be applied to plants, plant parts, or their habitats. Such materials include fertilizers, fungicides, insecticides, soil conditioning agents, and the like.

When operating in accordance with the present invention, a growth-altering amount of nitrostyrene compound is applied to a plant part in any convenient fashion. Applications to a growth medium can be carried out by simply mixing with the medium, such as by applying to the surface of soil and thereafter dragging or discing into the soil to the desired depth or by employing a liquid carrier to accomplish the penetration and impregnation. The application of spray and dust compositions to the surface of soil or to the above ground surfaces of plants can be carried out by conventional methods, e.g., power dusters, boom and hand sprayers and spray dusters.

In a further method, the distribution of nitrostyrene compound in soil can be accomplished by introducing the agent in the water employed to irrigate the soil. In such procedures, the amount of water can be varied with the porosity and water holding capacity of the soil to obtain a desired depth of distribution of the agent.

Other components of the habitat of a plant can be employed in the transfer of the agent of the present invention to a plant or plant part.

In addition, the present method also comprehends the employment of an aerosol composition containing nitrostyrene compound as an active compound. Such a composition is prepared according to conventional methods wherein the active ingredient is dispersed in a solvent, and the resultant dispersion mixed with a propellant in liquid state. Such variables as the particular active ingredient to be used and the particular plant part to be treated will determine the identity of the solvent and the concentration of the active ingredient therein. Examples of suitable solvents are water, acetone, isopropanol, and 2-ethoxyethanol. Also, employment of nitrostyrene compound in pastes, gels, foams, invert emulsions, and the like, as well as pigmented or unpigmented pelleted solids is comprehended.

The following examples further illustrate the present invention.

*Example 9*

In separate operations, aqueous compositions containing nitrostyrene compound are prepared as follows:

Four parts by weight of one of the nitrostyrene compounds, 0.08 part of sorbitan trioleate (Span 85), and 0.02 part of a sorbitan monooleate polyoxyethylene derivative (Tween 80) are dispersed in 40 milliliters of acetone to produce a concentrate composition in the form of a water-dispersible liquid containing one of the nitrostyrene compounds as sole active agent. In this procedure, concentrate compositions are separately prepared with each of p-nitro-α-(2,2,2-trichloroethyl)-styrene; m-nitro-α-(2,2,2-trichloroethyl)styrene; and o-nitro-α-(2,2,2-trichloroethyl)styrene.

A portion of each of these concentrate compositions is separately dispersed in a portion of water to provide an aqueous composition containing 0.44 pound of the respective nitrostyrene compound per 100 gallons of ultimate aqueous mixture.

*Example 10*

Aqueous compositions, one comprising p-nitro-α-(2,2,2-trichloroethyl)styrene, another comprising o-nitro-α-(2,2,2-trichloroethyl)styrene, were prepared in accordance with the procedures of Example 9. Each of these compositions was then employed for the treatment of seed beds of good agricultural soil which had been prepared and seeded to Japanese millet, sorgham (milo) and wild oats. In the treating operations, the compositions were applied to the seed beds as a soil drench and at a rate of about 0.43 acre inch of aqueous composition per acre to supply substantially uniform dosages of 50 pounds of the specified nitrostyrene compound per acre. This dosage corresponds to a concentration, within the soil depth penetrated, of about 82 parts by weight of nitrostyrene compound per million parts by weight of soil. Other seed beds similarly prepared and seeded were left untreated to serve as checks.

After about two weeks the seed beds were examined to ascertain what control of the growth of seeds and emerging seedlings had been obtained. The results are set forth in the following table:

| Subject Compound | Percent Kill and Control of the Growth of Seeds and Emerging Seedlings | | |
|---|---|---|---|
| | Millet | Wild Oats | Sorghum (Milo) |
| p-Nitro-α-(2,2,2-trichloroethyl)-styrene | 100 | 98 | 100 |
| o-Nitro-α-(2,2,2-trichloroethyl)-styrene | 95 | 98 | 95 |

At the time of observation, the check areas showed populous and vigorously growing stands of the named plant species.

*Example 11*

An aqueous composition containing o-nitro-α-(2,2,2-trichloroethyl)styrene was prepared as described in Example 9 and thereafter dispersed in a further quantity of water to prepare an aqueous spray composition containing about 0.18 pound of the compound per 100 gallons of ultimate mixture. This composition was employed for the treatment of seed beds which had been prepared and seeded with the seeds of various grass species and broadleaf plants. The grass species included crabgrass, wild oats, Sudan grass, meadow fescue and Japanese millet; and the broadleaf plants included cucumber, pinto beans, and radish. In the treating operations, the composition was applied as a soil drench and at a rate of 0.43 acre inch of composition per acre to supply a substantially uniform dosage of 20 pounds of the test compound per acre. This dosage corresponds to a concentration of about 33 parts by weight of styrene compound per million parts by weight of soil to the depth penetrated. Other beds similarly seeded with the named plant species were left untreated to serve as checks. After about two weeks the treated and check areas were examined to ascertain the percent kill and control of the growth of seeds and emerging seedlings. The results are set forth in the following table:

| | Percent kill and control of the growth of seeds and emerging seedlings |
|---|---|
| Crabgrass | 100 |
| Sudan grass | 98 |
| Japanese millet | 99 |
| Meadow fescue | 99 |
| Wild oats | 90 |
| Cucumber | 0 |
| Pinto beans | 0 |
| Radish | 0 |

The check beds were observed to support populous and vigorously growing stands of the named plant species.

*Example 12*

An aqueous composition containing m-nitro-α-(2,2,2-trichloroethyl)styrene was prepared as described in Example 9 and thereafter dispersed in water to produce an aqueous spray composition containing 0.04 pound of the compound per 100 gallons of ultimate mixture. This composition was employed according to the procedures of Example 11 except that because of the lower concentration of nitrostyrene compound in the treating composition, there was supplied to the soil a substantially uniform dosage of 5.0 pounds per acre of test styrene compound. The results of this evaluation are presented in the following table:

| | Percent kill and control of the growth of seeds and emerging seedlings |
|---|---|
| Pigweeds | 100 |
| Radish | 0 |
| German millet | 100 |
| White winter wheat | 20 |
| Crabgrass | 100 |
| Corn | 0 |
| Pinto bean | 0 |
| Sudan grass | 100 |
| Meadow fescue | 100 |

At the time of the observations, abundant and rapidly growing stands of the named species were found in the check areas.

*Example 13*

A concentrate composition containing m-nitro-α-(2,2,2-trichloroethyl)styrene was prepared as described in Example 9 and thereafter dispersed in water to produce an aqueous spray composition containing 10,000 parts of active agent per million parts by weight of resulting composition. This composition was applied as a foliage spray to plants of various grass and broadleaf species, the plants being of two to four inches in height and growing in seed beds. The treatments were carried out with conventional spray equipment, the plants being sprayed to the point of run-off, and the applications corresponding to a dosage of about 20 pounds of active agent per acre. Similar beds of the plant species were left untreated to serve as checks. After about two weeks, the beds were examined to ascertain what control of the growth of the plants had been obtained. The plant species employed, together with the results of the observations, are set forth in the following table:

| | Percent kill and control of the growth of seedling species |
|---|---|
| Pigweeds | 100 |
| Radish | 100 |
| German millet | 90 |
| White winter wheat | 5 |
| Crabgrass | 100 |
| Corn | 5 |
| Pinto bean | 0 |

At the time of the observations, the check area supported a populous growth of all plant species.

*Example 14*

A concentrate composition containing m-nitro-α-(2,2,2-trichloroethyl)styrene was prepared in accordance with Example 9 and thereafter dispersed in water to prepare an aqueous spray composition containing 0.08 pound of the compound per 100 gallons of ultimate mixture. This composition was employed for the control of Japanese millet, in accordance with the procedures of Example 9, the dosage of compound in the present evaluation being approximately 10 pounds of compound per acre. Following the observations, the beds were reseeded with Japanese millet seeds and held for another two week period under favorable agricultural conditions. At this time, another reading was made to determine the percent kill and control of the growth of Japanese millet. The beds were again reseeded and observed after two weeks. The results of the initial reading, as well as the subsequent readings following the two reseedings, are set forth in the following table:

| | Percent kill and control of the growth of Japanese millet seeds and seedlings |
|---|---|
| Initial Reading | 100 |
| Reading following first reseeding | 100 |
| Reading following second reseeding | 100 |

I claim:
1. Compound of the formula:

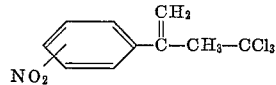

2. The compound of claim 1 wherein the nitro group is on the ortho position, namely, o-nitro-α-(2,2,2-trichloroethyl)styrene.

3. The compound of claim 1 wherein the nitro group is on the meta position, namely, m-nitro-α-(2,2,2-trichloroethyl)styrene.

4. The compound of claim 1 wherein the nitro group is on the para position, namely, p-nitro-α-(2,2,2-trichloroethyl)styrene.

5. Compound of the formula:

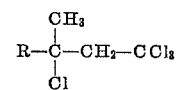

wherein R represents (m-nitrophenyl) or (p-nitrophenyl).

6. The compound of claim 5 wherein R represents (m-nitrophenyl), namely, 3-(m-nitrophenyl)-1,1,1,3-tetrachlorobutane.

7. The compound of claim 5 wherein R represents (p-nitrophenyl), namely, 3 - (p - nitrophenyl) - 1,1,1,3-tetrachlorobutane.

8. Method of synthesis which comprises contacting α-(2,2,2-trichloroethyl)styrene with a nitrating agent, whereby there is obtained a compound of the formula

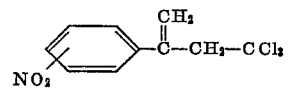

9. The method of claim 8 wherein the nitrating agent is a mixture of nitric and sulfuric acids.

10. The method of claim 8 wherein the nitrating agent is acetyl nitrate.

11. The method of claim 10 wherein the acetyl nitrate is prepared in situ from nitric acid and acetic anhydride.

References Cited

UNITED STATES PATENTS

| 2,762,848 | 9/1956 | Johnson | 260—646 |
| 2,898,381 | 8/1959 | Tinsley | 260—646 |
| 3,182,091 | 5/1965 | Scherer et al. | 260—646 |

OTHER REFERENCES

Perekalin: Unsaturated Nitro Compounds, published by Daniel Davey & Co., Inc., New York, N.Y. 1964, pp. 81, 82 and 87.

CARL D. QUARFORTH, *Primary Examiner.*

L. A. SEBASTIAN, *Assistant Examiner.*